Nov. 22, 1960   F. L. DAVIS   2,960,890
VARIABLE TORQUE TRANSMISSIONS
Original Filed Jan. 7, 1953
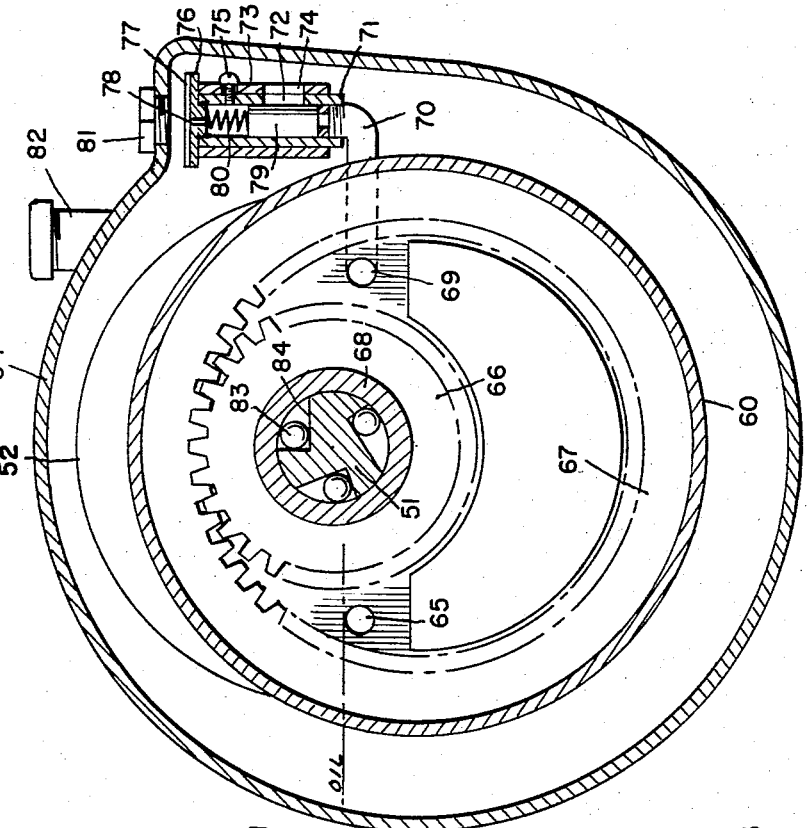
INVENTOR.
Frederick L. Davis
BY Francis G. Boswell
ATTY

United States Patent Office 2,960,890
Patented Nov. 22, 1960

2,960,890

VARIABLE TORQUE TRANSMISSIONS

Frederick L. Davis, Fort Worth, Tex., assignor, by mesne assignments, to Welex, Inc., Fort Worth, Tex., a corporation of Delaware Original application Jan. 7, 1953, Ser. No. 330,113, now Patent No. 2,782,660, dated Feb. 26, 1957. Divided and this application July 10, 1956, Ser. No. 596,984

10 Claims. (Cl. 74—786)

This is a division of an application filed January 7, 1953, Serial No. 330,113, now U.S. Patent 2,782,660, issued February 26, 1957.

The object of the invention is to provide transmission in which it will be possible to secure variable torque and variable speed at the output, as where the invention is employed in auto-vehicular use; to provide an automatic transmission in which the torque and speed vary inversely in infinitesimal increments and decrements; and generally to provide a transmission of the kind indicated in which the parts employed are reduced to a minimum, thus making the mechanism susceptible of cheap manufacture and sale.

With this object in view, the invention consists in a construction and combination of parts, of which a preferred embodiment is illustrated in the accompanying drawings in which:

Figure 1 is a diametrical, vertical, sectional view of the invention; and

Figure 2 is a sectional view on the plane indicated by line 2—2 of Figure 1.

As illustrated, the invention is designed for interposition between the engine-coupled input shaft 50 and the output shaft 51 for driving the propeller shaft. The shafts 50 and 51 are operatively connected through an epicyclic gear train of which the orbit gear carrier 52 is of cylindrical form, open on the rear face, and, on the inner periphery of the cylindrical portion, is provided with a series of teeth which constitute the orbit gear or ring gear 53, in mesh with which are the planet gears 54 which, in turn, mesh with the sun gear 56 carried by the shaft 51.

The planet gears 54 rotate freely on shafts 55 spanning the plate 57 and the ring 58, the plate 57 being integral with the hub 59 which is fixed to the input shaft 50.

The orbit gear carrier is so dimensioned that it functions as a cage or enclosure for the entire system of planetary gears. The orbit gear carrier actuates the gear pump which is enclosed in case 60 secured to the rear cover plate 61 which, together with the front cover plate 62, is secured by means of screws 63 to the case 64, the case 60 housing the entire pump apparatus and being charged with oil, as indicated, up to a point just above the level of the intake 65 of the gear pump.

The gear pump comprises the spur gear 66 and intermeshing ring gear 67, the former being mounted on the hub 68 of the orbit gear carrier. so that when the latter rotates, the gears 66 and 67 will also rotate and oil will be drawn in through the intake 65 and delivered through the discharge 69 into the conductor 70. which communicates with a valve cylinder 71 provided with a lateral port 72. This valve cylinder is closed at the upper end and is surrounded by a sleeve 73 which is also provided with a lateral port, indicated at 74, registering with the port 72 in a certain position of the sleeve, which has a screw and slot connection 75 with the valve cylinder to limit its angular adjustment on the latter. The sleeve is formed with a cap 76 provided with a kerf 77 and both it and the closed end of the cylinder are ported, as indicated at 78, so as to provide for free upward movement of the plunger 79, which normally is spring pressed, as indicated at 80, toward the lower end of the cylinder, in which position it covers the port 72. The case 64 is provided with a screw plug 81 directly above the valve, so that the former may be removed to give access to the valve for adjustment of the sleeve on the cylinder to obtain the desired effective port area. This adjustment can be made with a screw driver inserted in the kerf 77.

The case is also provided with a capped filling tube 82 through which to charge the case with oil.

In operation, the invention is interposed between the engine and the propeller shaft of the equipped vehicle, the input shaft 50 being connected with the crank shaft of the engine, and the output shaft 51 being connected with the propeller shaft of the vehicle. Since the direction of rotation of the engine is right-handedly when viewed from the front end of the vehicle, shafts 50 and 51 have such direction of rotation when viewed from the input end of the transmission. Since Figure 2, however, shows the invention as viewed from the output end, the gearing comprised in the invention will therein appear as rotating left-handedly.

When the engine is started, the planet gears 54 will be rotated bodily around the sun gear and, since that will at that time be at rest, they will be rotated on their own axes, and the direction of both bodily and axial rotation will, of course, be left-handedly. But the planet gears being in mesh with the ring gear, the latter will also be rotated left-handedly and, by reason of its operative connection with the pump, will drive the pump gears 66 and 67, which will take in oil from the case 64 through intake 65 and transfer it in two separate paths to the discharge 69, and thence into the conductor 70 and against spring-pressed plunger 79, raising that to expose the ports 72 and 74, through which the oil will be returned to the case. But this movement of oil by the pump will impose a restraining force on the ring gear, thus tending to slow up its rotation and the axial rotation of the planet gears, and thereby initiate a turning movement to the sun gear, thus starting the load into motion and accelerating the same, the planet gears, the while, dropping off in axial rotation and then coming to rest except for their bodily rotation, when the ring gear and the sun gear will have synchronous angular movement.

In order that the angular speed of the ring gear may never drop below that of the sun gear, an overrunning clutch is interposed between the ring gear and the output shaft 51 and consists of balls 83 seated in slots 84, formed in the shaft 51 on its periphery within the confines of hub 68. In elevation, the slots have the form of segments of a circle so positioned that one wall extends in a radial direction and the other in a tangential direction. When the balls abut the radial wall, the hub 68 rotates free of the shaft 51 and the ring gear can lead the sun gear in angular speed. But the reverse is not true. The sun gear can never lead the ring gear because such motion would tend to move balls 83 away from the radial walls of the slots and they then bear on the inner periphery of the hub.

To treat the manner of operation more specifically: It should be noted that all the gears, both in their axial and translational rotation, turn in the same direction, except only at the instant of starting when the sun gear will be at rest. While no attempt has been made in the drawings to fix definite sizes, the pitch diameters of the several gears are shown to be in geometrical progression, that is, the pitch diameter of the sun gear is twice that of the planet gears and the pitch diameter of the ring gear is twice that of the sun gear. In an epicyclic gear train the relative speeds of the gears are those compounded of their translational or bodily movements and their rotary movements on their own axes. In the instant case, with the planet gear carrier rotating, the ring gear will execute one translational revolution for each revolution of the carrier and will further acquire an additional increment of angular movement represented by the sun gear-ring gear ratio which is one-half. ($1+S/R$ or $1\frac{1}{2}$.) Thus, for each revolution of the input shaft and with it the carrier, the ring gear will execute one and one-half revolutions and the pump will be driven at its greatest speed until the sun gear and its output shaft are set in motion.

The energy expended in the operation of gear pumps is the product of the rate, the volume and the distance the volume is moved and the variation of any one of these factors varies the energy required. Obviously, in this invention, it is necessary to reduce the rate and the output valve functions to accomplish this. Initially the valve plunger 79 is raised to a position high enough to permit free discharge of the volume at the speed of the ring gear, as determined by the speed of the input shaft and carrier, but the immediate effect of the spring-pressed plunger is to create a back pressure and, following Pascal's law, to multiply that pressure in the discharge chamber of the pump as a back pressure which progressively reacts on the ring gear, through the pump, to retard rotation of the ring gear; and this continues until the sun gear accelerates and the ring gear decelerates into synchronism with the carrier and with it the input shaft. This synchronous operation will obtain as long as there is no variation in the load on the output shaft or variation in speed of the input shaft. But let either vary and the transmission elements will then fall into asynchronous operation which will continue as long as the variation exists, but synchronism will be restored in the manner above described when the torque and speed of the input shaft equal respectively the torque and speed of the output shaft.

The overrunning clutch above described performs no function in the synchronizing or desynchronizing of the transmission elements. All rotating in the same direction, the ring gear can and does lead the carrier in angular movement but can never follow it; likewise it can and does lead the sun gear but can never follow it. Assuming the transmission elements to be relatively stationary (in synchronous operation) and the equipped vehicle to approach and start the ascent of an incline, immediately there is an increased torque demand on the output shaft, thus slowing the sun gear. The ring gear will be then accelerated ahead of the carrier and the torque and speed of the output shaft will be varied inversely to the point where their product will equal the product of these two factors in input shaft, whether the speed of that has been varied or not. This gear reduction will continue until the load on the output shaft begins to decline when the latter will be accelerated into synchronism with the carrier and the whole will rotate as a unit, since synchronizing any two of the three elements synchronizes all.

The overrunning clutch operates to prevent the output shaft ever leading the ring gear when the former tends to drive the mechanism, as when the equipped vehicle descends an incline. This clutching of the ring gear and output shaft automatically renders them stationary with respect to the carrier and input shaft and thereby insures the transmission operating as a unit to utilize the engine as a brake in conjunction with the foot brake as in conventional practice.

Also this clutch has another useful function. When the transmission is employed in vehicular use, reversal of rotation will be necessary for backing. This, of course, will require a reversing gear which can best be interposed between the motor or engine shaft and the transmission. When in operation the transmission as a whole will be reversed and the ring gear will be immediately coupled with the output shaft and the transmission elements will be rendered relatively stationary, thus providing for backward movement of the equipped car without the performance of the speed reducing functions which, under such conditions, are unnecessary.

The invention having been described, what is claimed as new and useful is:

1. A transmission of the kind indicated comprising input and output shafts, a sun gear fixed to one of said shafts, a set of planet gears, a carrier on which said planet gears are mounted for axial rotation, the carrier being fixed to the other of said shafts, a ring gear in surrounding relation to the planet gear and in mesh with the same, the planet gears being in mesh with the sun gear, a gear pump operatively connected with the ring gear to impose a progressive retarding force on the same, and means automatically coupling the ring gear with the output shaft when the latter tends to exceed the angular velocity of the input shaft or when the rotation of the input shaft is reversed.

2. A transmission of the kind indicated comprising input and output shafts, a sun gear fixed to one of said shafts, a set of planet gears, a carrier on which said planet gears are mounted for axial rotation, the carrier being fixed to the other of said shafts, a ring gear in surrounding relation to the planet gears and in mesh with the same, the planet gears being in mesh with the sun gear, a gear pump operatively connected with the ring gear to impose a progressive retarding force on the same, and an overrunning clutch automatically coupling the ring gear with the output shaft when the latter tends to exceed the angular velocity of the input shaft or when the rotation of the input shaft is reversed.

3. A transmission of the kind indicated comprising input and output shafts, a sun gear fixed to one of said shafts, a set of planet gears, a carrier on which said planet gears are mounted for axial rotation, the carrier being fixed to the other of said shafts, a ring gear in surrounding relation to the planet gears and in mesh with the same, the planet gears being in mesh with the sun gear, a gear pump operatively connected with the ring gear to impose a progressive retarding force on the same, and an overrunning clutch consisting of balls resting in slots in the output shaft and a hub on the ring gear in surrounding relation to the balls, the overrunning clutch coupling the ring gear to the output shaft when the latter tends to exceed the angular velocity of the input shaft or when the rotation of the input shaft is reversed.

4. A transmission of the character indicated comprising input and output shafts, and an epicyclic gear train operatively connecting the same, the gear train including a first gear connected to the input shaft, a second gear connected to the output shaft, and a third gear whose angular velocity determines the speed ratio of the input and output shafts, and means including a gear pump operatively connected with the third gear to vary automatically the speed of the third gear in accordance with the torque requirements of the output shaft.

5. A transmission of the character indicated comprising input and output shafts, and an epicyclic gear train operatively connecting the same, the gear train including a first gear connected to the input shaft, a second gear connected to the output shaft, and a third gear whose angular velocity determines the speed ratio of the input and output shafts, and a speed controlling device including a gear pump operable on the third gear to vary automatically its speed inversely to that of the output shaft.

6. A transmission of the character indicated comprising input and output shafts, and an epicyclic gear train operatively connecting the same, the gear train including a first gear connected to the input shaft, a second gear connected to the output shaft, and a third gear whose angular velocity determines the speed ratio of the input and output shafts, a speed controlling device including a gear pump operable on the third gear to vary automatically its speed inversely to that of the output shaft, and a one-way clutch interposed between the third gear and the output shaft to prevent relative reverse rotations of the same.

7. A transmission of the kind indicated comprising input and output shafts, a sun gear fixed to the output shaft, a set of planet gears, a carrier on which said planet gears are mounted for axial rotation, the carrier being fixed to the input shaft, a ring gear in surrounding relation to the planet gears and in mesh with the same, the planet gears being in mesh with the sun gear, means including a gear pump operatively connected with the ring gear to impose a progressive retarding force on the same, and means automatically coupling the ring gear with the output shaft when the latter tends to lead the ring gear.

8. A transmission of the kind indicated comprising input and output shafts, a sun gear fixed to the output shaft, a set of planet gears, a carrier on which said planet gears are mounted for axial rotation, the carrier being fixed to the input shaft, a ring gear in surrounding relation to the planet gears and in mesh with the same, the planet gears being in mesh with the sun gear, means including a gear pump operatively connected with the ring gear to impose a progressive retarding force on the same, and an overrunning clutch automatically coupling the ring gear with the output shaft when the latter tends to lead the ring gear.

9. A transmission of the kind indicated comprising input and output shafts, a sun gear fixed to the output shaft, a set of planet gears, a carrier on which said planet gears are mounted for axial rotation, the carrier being fixed to the input shaft, a ring gear in surrounding relation to the planet gears and in mesh with the same, the planet gears being in mesh with the sun gear, means including a gear pump operatively connected with the ring gear to impose a progressive retarding force on the same, said retarding force imposing means further including valve means controlling the output of said pump to load the latter and means resiliently urging said valve means to closed position, and an overrunning clutch automatically coupling the ring gear with the output shaft when the latter tends to lead the ring gear.

10. A transmission of the kind indicated comprising a sun gear element, a set of planet gears in mesh with said sun gear element, a carrier on which said planet gears are mounted for axial rotation, a ring gear element in surrounding relation to said planet gears and in mesh with the same, an input shaft fixed to said carrier, an output shaft fixed to one of said gear elements, means including a gear pump operating against a resiliently biased load, said means being operatively connected to the other of said gear elements to impose progressive retarding force on the same, and means automatically coupling said other gear element with the output shaft when the latter tends to lead said other gear element.

References Cited in the file of this patent

UNITED STATES PATENTS

| | | |
|---|---|---|
| 1,359,896 | Jeal | Nov. 23, 1920 |
| 2,212,046 | Ross | Aug. 20, 1940 |
| 2,281,384 | Ross | Apr. 28, 1942 |
| 2,445,573 | Godbe | July 20, 1948 |
| 2,464,494 | Ferreira | Mar. 15, 1949 |
| 2,517,188 | Feng | Aug. 1, 1950 |
| 2,787,820 | Blaha | Apr. 9, 1957 |
| 2,804,748 | Hutchinson | Sept. 3, 1957 |